United States Patent
Surnilla et al.

(10) Patent No.: US 9,611,801 B2
(45) Date of Patent: Apr. 4, 2017

(54) METHODS AND SYSTEMS FOR FIXED AND VARIABLE PRESSURE FUEL INJECTION

(71) Applicant: Ford Global Technologies, LLC, Dearborn, MI (US)

(72) Inventors: Gopichandra Surnilla, West Bloomfield, MI (US); Joseph F. Basmaji, Waterford, MI (US); Mark Meinhart, South Lyon, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 277 days.

(21) Appl. No.: 14/570,664

(22) Filed: Dec. 15, 2014

(65) Prior Publication Data
US 2016/0169147 A1    Jun. 16, 2016

(51) Int. Cl.
| | | |
|---|---|---|
| *F02D 41/38* | (2006.01) | |
| *F02M 37/00* | (2006.01) | |
| *F02D 41/24* | (2006.01) | |
| *F02D 41/06* | (2006.01) | |
| *F02D 41/40* | (2006.01) | |

(Continued)

(52) U.S. Cl.
CPC ....... *F02D 41/3863* (2013.01); *F02D 41/064* (2013.01); *F02D 41/2461* (2013.01); *F02D 41/2467* (2013.01); *F02D 41/3854* (2013.01); *F02D 41/406* (2013.01); *F02M 37/0023* (2013.01); *F02D 2041/389* (2013.01);
(Continued)

(58) Field of Classification Search
CPC .......... F02D 41/38; F02D 41/30; F02D 41/24; F02D 41/3863; F02D 41/064; F02D 41/389; F02D 41/0235; F02D 41/2464; F02D 41/3854; F02D 41/2461; F02M 63/209; F02M 63/2085; F02M 37/0023; F02M 63/023; F02M 63/02; F02M 55/00; Y02T 10/42

See application file for complete search history.

(56) References Cited

U.S. PATENT DOCUMENTS

| | | | |
|---|---|---|---|
| 5,575,625 A | 11/1996 | Castel | |
| 6,016,791 A * | 1/2000 | Thomas | ............... F02D 41/3845 123/456 |

(Continued)

OTHER PUBLICATIONS

Vanderwege, Brad A. et al., "Direct Injection Fuel Pump," U.S. Appl. No. 14/547,998, filed Nov. 19, 2014, 74 pages.

(Continued)

*Primary Examiner* — Hieu T Vo
(74) *Attorney, Agent, or Firm* — Julia Voutyras; McCoy Russell LLP

(57) ABSTRACT

Methods and systems are provided for operating a high pressure injection pump to provide each of high fixed fuel pressure at a first direct injection fuel rail and high variable fuel pressure at a second direct injection fuel rail. The direct injection fuel rail pressure can be raised above a pressure provided with a lift pump via a fuel system configuration that includes various check valves, pressure relief valves, and a spill valve positioned between an inlet of the high pressure injection pump and the port injection fuel rail. Fixed and variable high pressure direct injection may be advantageously used to provide learn the ballistic region of each direct injector.

21 Claims, 7 Drawing Sheets

(51) Int. Cl.
    *F02M 63/02*     (2006.01)
    *F02D 41/30*     (2006.01)

(52) U.S. Cl.
    CPC ... *F02D 2041/3881* (2013.01); *F02M 63/029* (2013.01); *F02M 63/0285* (2013.01)

(56) References Cited

U.S. PATENT DOCUMENTS

| | | | |
|---|---|---|---|
| 6,092,502 A * | 7/2000 | Atago | F02B 31/06 123/301 |
| 7,017,553 B2 * | 3/2006 | Boehland | F02M 45/04 123/446 |
| 7,353,798 B2 | 4/2008 | Tokuda et al. | |
| 7,389,766 B2 | 6/2008 | Akita et al. | |
| 8,245,693 B2 | 8/2012 | Surnilla et al. | |
| 8,776,764 B2 | 7/2014 | Basmaji et al. | |
| 9,316,161 B2 * | 4/2016 | Surnilla | F02D 33/003 |
| 9,404,435 B2 * | 8/2016 | Ranga | F02D 41/3094 |
| 2003/0127070 A1 | 7/2003 | Xu | |
| 2007/0199542 A1 | 8/2007 | Tokuda et al. | |

OTHER PUBLICATIONS

Surnilla, Gopichandra et al., "Methods and Systems for Fixed and Variable Pressure Fuel Injection," U.S. Appl. No. 14/570,546, filed Dec. 15, 2014, 51 pages.

Surnilla, Gopichandra et al., "Zero Flow Lubrication for a High Pressure Fuel Pump," U.S. Appl. No. 14/586,683, filed Dec. 30, 2014, 59 pages.

Surnilla, Gopichandra et al., "High Pressure Fuel Pumps with Mechanical Pressure Regulation," U.S. Appl. No. 14/243,615, filed Apr. 2, 2014, 53 pages.

Surnilla, Gopichandra et al., "Methods and Systems for High Pressure Port Fuel Injection," U.S. Appl. No. 14/570,802, filed Dec. 15, 2014, 32 pages.

* cited by examiner

METHODS AND SYSTEMS FOR FIXED AND VARIABLE PRESSURE FUEL INJECTION

FIELD

The present description relates to systems and methods for adjusting operation of fuel injectors for an internal combustion engine. The methods may be particularly useful for an engine that includes fixed and variable high pressure direct fuel injectors.

BACKGROUND AND SUMMARY

Direct fuel injection (DI) systems provide some advantages over port fuel injection systems. For example, direct fuel injection systems may improve cylinder charge cooling so that engine cylinders may operate at higher compression ratios without incurring undesirable engine knock. However, direct fuel injectors may not be able to provide a desired amount of fuel to a cylinder at higher engine speeds and loads because the amount of time a cylinder stroke takes is shortened so that there may not be sufficient time to inject a desired amount of fuel. Consequently, the engine may develop less power than is desired at higher engine speeds and loads. In addition, direct injection systems may be more prone to particulate matter emissions.

In an effort to reduce the particulate matter emissions and fuel dilution in oil, very high pressure direct injection systems have been developed. For example, while nominal direct injection maximum pressures are in the range of 150 bar, the higher pressure DI systems may operate in the range of 250-800 bar.

One issue with such high pressure DI systems is that the dynamic range of the injectors may be limited by the rail pressure. Specifically, when the rail pressure is very high and the engine has to operate at low loads, the injector pulse width may be very small. Under such small pulse width conditions, injector operation may be highly variable. In addition, at very low pulse widths, the injectors may not even open. These conditions can result in large fueling errors.

In one example, the above issue may be at least partly addressed by a method for an engine, comprising: operating a high pressure fuel pump to direct inject fuel at a variable pressure via a first fuel rail, and at a fixed pressure via a second fuel rail, fuel delivery from the pump controlled via an upstream pressure control valve, wherein the second rail is coupled to an inlet of the pump while the first rail is coupled to a pump outlet. In addition, high pressure fuel pump operation may be advantageously used to split the fuel injected into each cylinder between the fixed pressure and variable pressure direct injectors so as to learn the ballistic region of each direct injector.

As an example, a fuel system may be configured with a low pressure lift pump and a high pressure injection pump. The high pressure pump may be a piston pump. An output of the high pressure injection pump may be controlled mechanically, and not electronically, via the use of a magnetic solenoid valve (MSV). At least one check valve and one pressure relief valve (or over-pressure valve) may be coupled between the lift pump and the injection pump. A first fuel rail delivering fuel at variable high pressure to a first group of direct fuel injectors may be coupled to an outlet of the injection pump via a check valve and a pressure relieve valve. Likewise, a second fuel rail delivering fuel at fixed high pressure to a second group of direct fuel injectors may be coupled to an inlet of the injection pump, also via a check valve and a pressure relieve valve. During conditions when the high pressure piston pump is not reciprocating, such as before engine cranking, the check valves, pressure relief valves, and the MSV enables a fixed pressure of the second fuel rail to be raised to lift pump pressure (typically 5 bar (g)). While the pump is reciprocating, the pressure of the second fuel rail delivering fuel to the second group of direct injectors can be raised to the same level as the minimum pressure of the first fuel rail delivering variable pressure fuel to direct injectors (such as at 15 bar). The pressure of the first fuel rail may be further raised and varied by adjusting the pump output via the MSV. Thus, based on engine operating conditions, fuel may be delivered at fixed or variable high pressure to an engine cylinder via direct injection. Further, during selected learning conditions, a ballistic region of the direct injectors coupled to the variable high pressure fuel rail may be learned by applying an injector pulse width in the ballistic region, while operating direct injectors coupled to the fixed high pressure fuel rail with an injector pulse width in the linear region, and observing a change in exhaust air-to-fuel ratio from stoichiometry.

In this way, fixed high pressure direct fuel injection may be provided at fuel pressures that are higher than the pressure provided by a lift pump. More specifically, a high pressure displacement pump can be advantageously used for providing variable high pressure to a first direct injection fuel rail while also providing a fixed high pressure to a second direct injection fuel rail. By raising the default fixed pressure of second direct injection fuel rail to be as high as the minimum pressure of the first direct injection fuel rail, the benefits of high pressure direct injection can be extended over a wider range of operating conditions. For example, smaller amounts/volumes of fuel can be direct injected more accurately via direct injectors coupled to the fixed pressure fuel rail when direct injection of the equivalent amount is limited by the pulse-width or dynamic range of the direct fuel injectors coupled to the variable pressure fuel rail (such as a very high or very low engine speed-load conditions, as well as during engine cold-starts). Further still, fuel may be delivered in a cylinder cycle over a larger number of split fuel injections in the intake and compression stroke by leveraging direct injection from both fuel rails. Overall, fuel injection efficiency is increased and fueling errors are reduced, improving engine performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
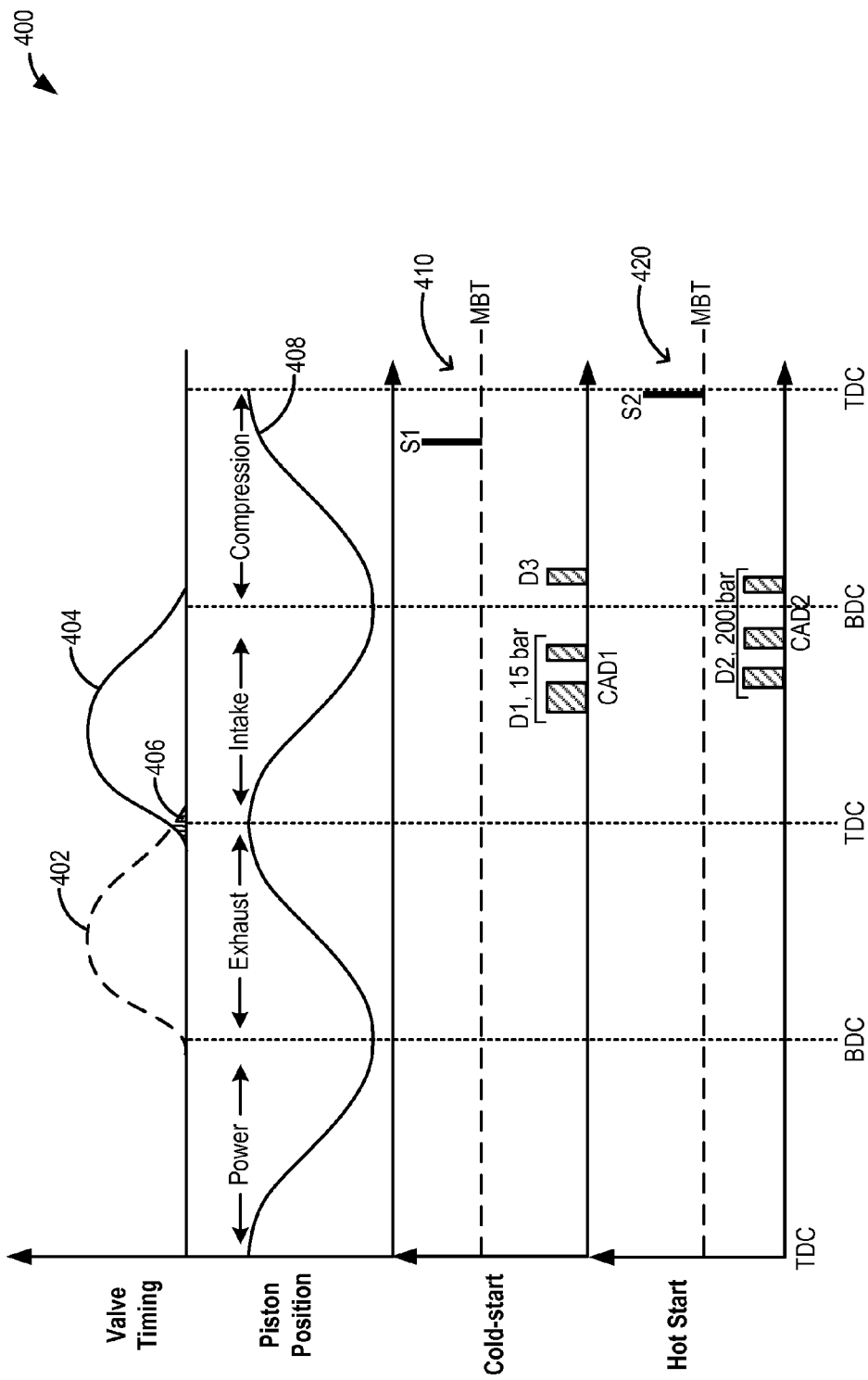
FIG. 4 shows example fuel injection profiles that may be applied via the fuel system of FIGS. 2-3 during an engine cold-start operation.
Figure 5:
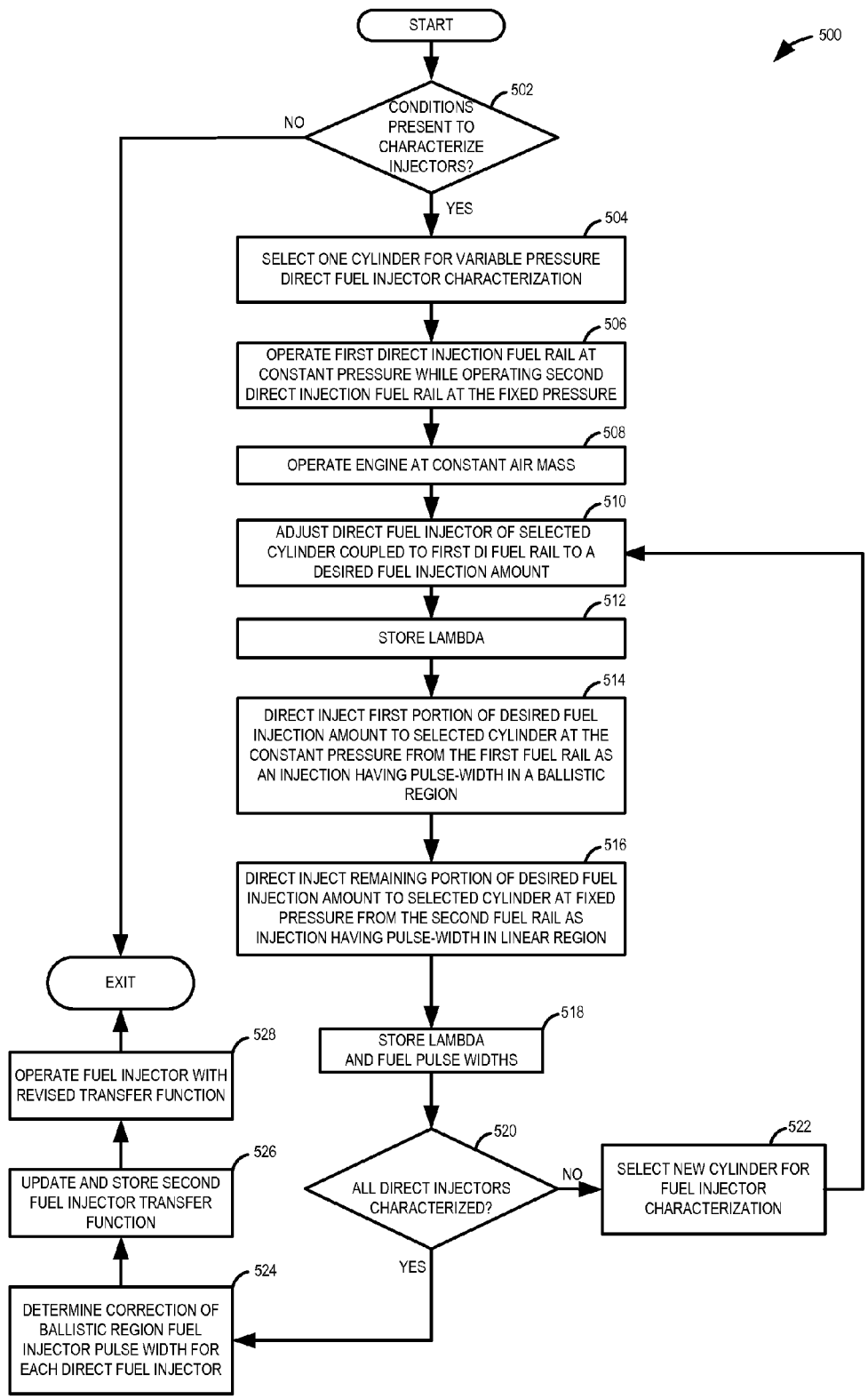
FIG. 5 depicts a flow chart of a method for learning a ballistic region of the direct injectors.
Figure 6:
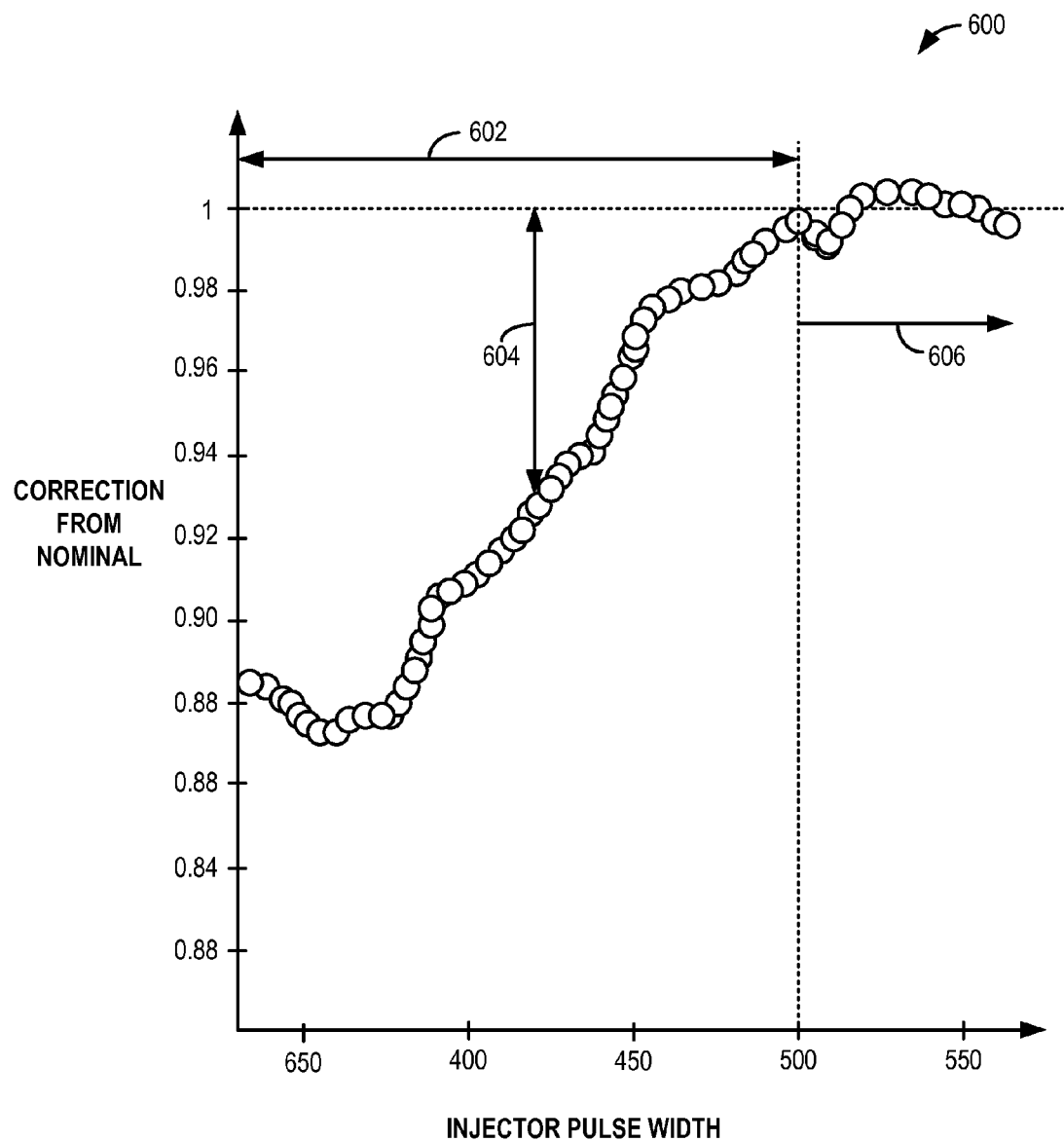
FIG. 6 shows an example learning of a ballistic region of a direct injector based on a change in exhaust lambda value, according to the present disclosure.
Figure 7:
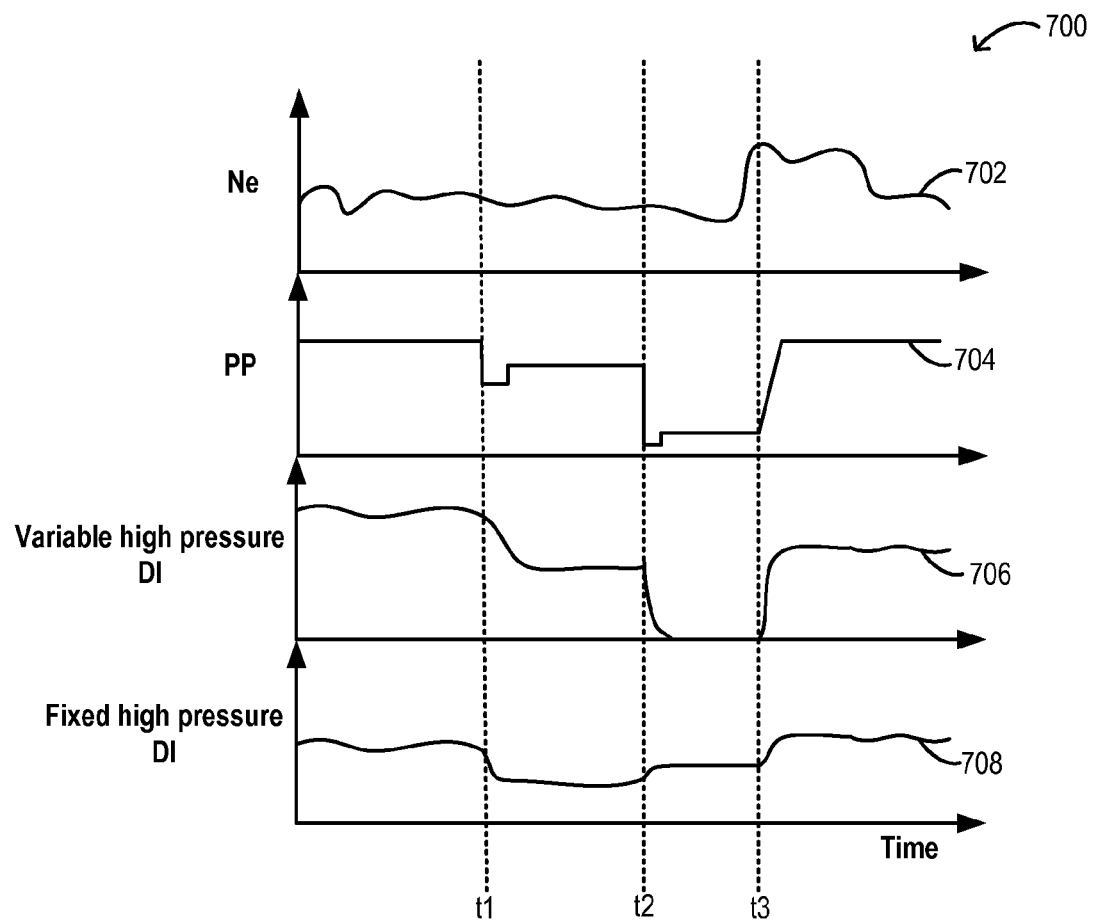
FIG. 7 shows an example fuel injection adjustment responsive to a tip-in event, according to the present disclosure.

The following detailed description provides information regarding a high pressure fuel pump and a system for mechanically-regulating the pressure in each of a fixed pressure and variable pressure fuel rail coupled to direct injectors. An example embodiment of a cylinder in an internal combustion engine is given in FIG. 1 while FIG. 2 depicts a fuel system that may be used with the engine of FIG. 1. The high pressure pump with mechanical pressure regulation and related fuel system components shown in detail at FIG. 2 enable the fixed pressure direct injection fuel rail to be operated at a pressure higher than the default pressure of a lift pump while concurrently enabling the variable pressure direct injection fuel rail to be operated in a variable high pressure range. A method for adjusting fuel delivery via the direct injection fuel rails is shown with reference to FIG. 3. For example, direct injection at the fixed pressure may be used at an engine cold-start due to the limited dynamic range of the variable high pressure direct injectors during those conditions, as shown at FIG. 4. In addition, as shown at FIGS. 5-6, a controller may learn a fuel injector transfer function in a ballistic region of each direct injector by splitting fuel injection to a given cylinder between a direct injector receiving fuel from the fixed pressure fuel rail and a direct injector receiving fuel from the variable pressure fuel rail. An example fuel injection adjustment between the injectors responsive to change in engine operating conditions, such as during a tip-out, is shown at FIG. 7.

Regarding terminology used throughout this detailed description, a high pressure pump, or direct injection pump, may be abbreviated as a DI or HP pump. Similarly, a low pressure pump, or lift pump, may be abbreviated as a LP pump. Port fuel injection may be abbreviated as PFI while direct injection may be abbreviated as DI. Also, fuel rail pressure, or the value of pressure of fuel within a fuel rail, may be abbreviated as FRP. Also, the mechanically operated inlet check valve for controlling fuel flow into the HP pump may also be referred to as the spill valve. As discussed in more detail below, an HP pump that relies on mechanical pressure regulation without use of an electronically-controlled inlet valve may be referred to as a mechanically-controlled HP pump, or HP pump with mechanically-regulated pressure. Mechanically-controlled HP pumps, while not using electronically-controlled inlet valves for regulating a volume of fuel pumped, may provide one or more discrete pressures based on electronic selection.

Figure 1:
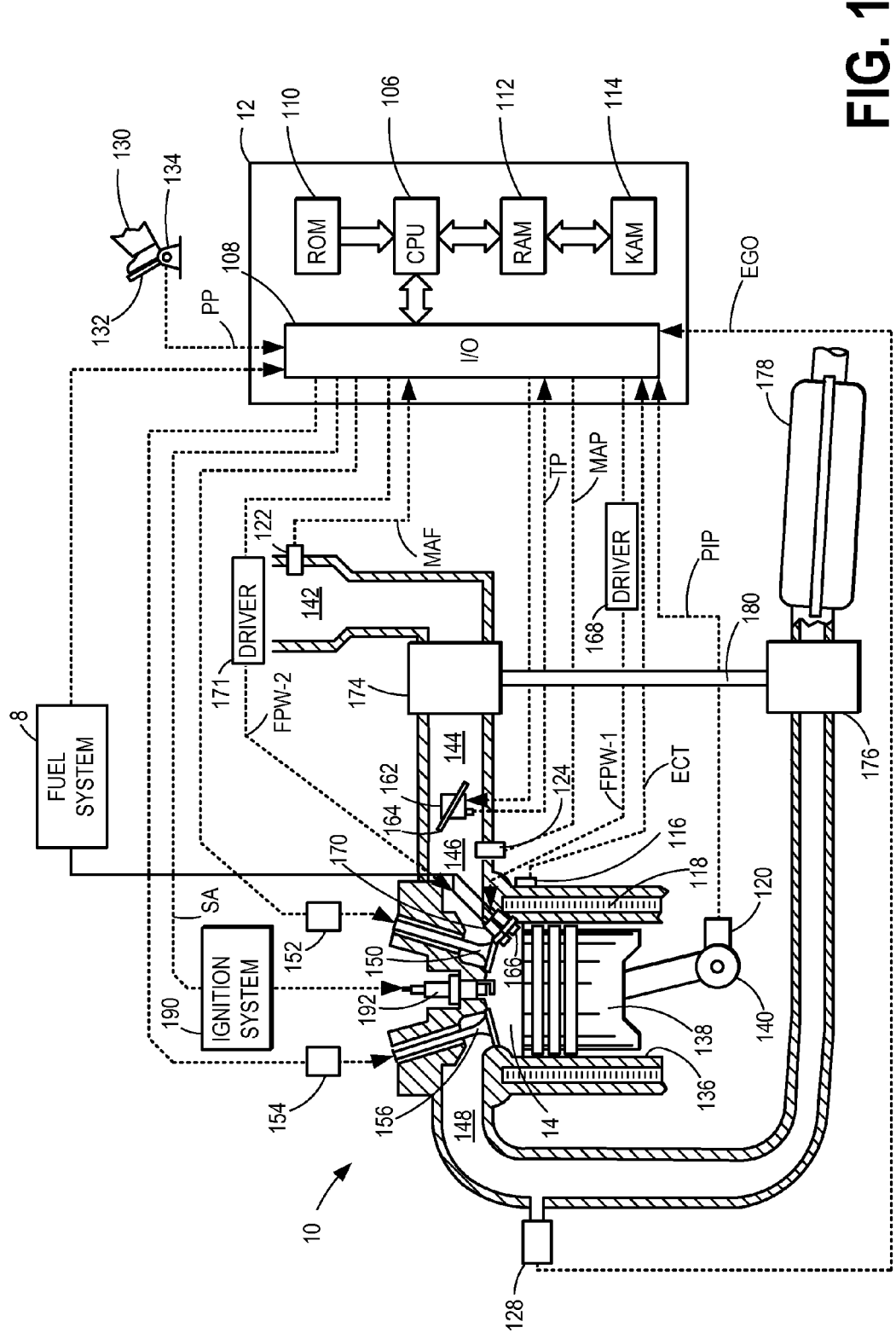
FIG. 1 schematically depicts an example embodiment of a cylinder of an internal combustion engine.
Figure 2:
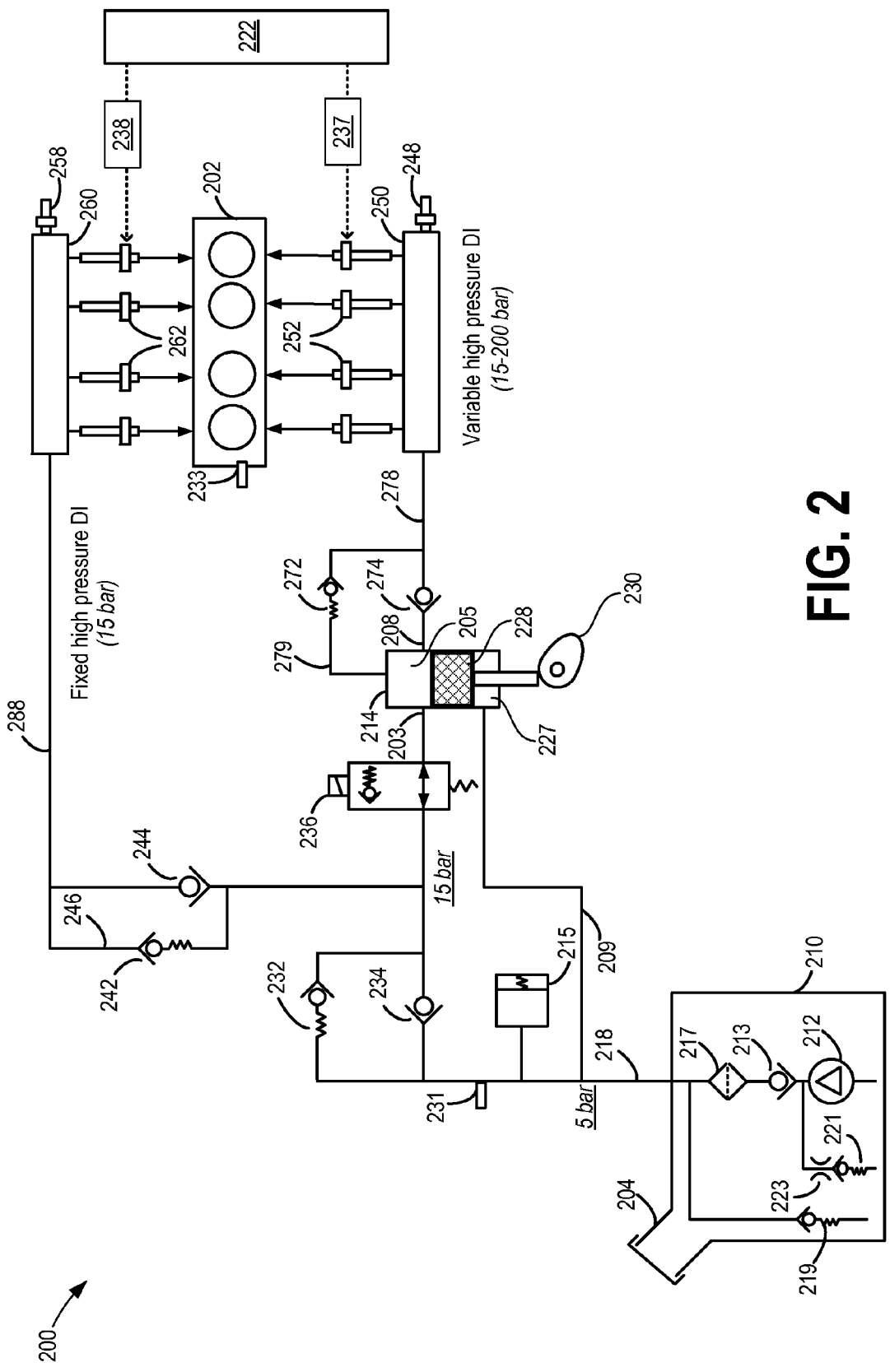
FIG. 2 schematically depicts an example embodiment of a fuel system, configured for mechanically-regulated fixed and variable high pressure direct injection that may be used with the engine of FIG. 1.

FIG. 1 depicts an example of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. As elaborated with reference to FIG. 2, fuel system 8 may include one or more fuel tanks, fuel pumps, and fuel rails. Fuel injectors 166 and 170 are each shown coupled directly to cylinder 14 for injecting fuel directly therein in proportion to the pulse width of signals FPW-1 and FPW-2, received from controller 12 via electronic drivers 168 and 171, respectively. In this manner, fuel injectors 166 and 170 provide what is known as direct injection (hereafter referred to as "DI") of fuel into combustion cylinder 14. While FIG. 1 shows injectors 166 and 170 positioned to one side of cylinder 14, one or more of injectors 166, 170 may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12. Note that a single driver 168 or 171 may be used for both fuel injectors, or multiple drivers may be used, as depicted.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The directly injected fuel may be delivered during an intake stroke, as well as partly during a previous exhaust stroke, during the intake stroke, and partly during the compression stroke, for example. As such, even for a single combustion event, injected fuel may be injected at different timings from each direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

FIG. 2 schematically depicts an example embodiment 200 of a fuel system, such as fuel system 8 of FIG. 1. Fuel system 200 may be operated to deliver fuel to an engine, such as engine 10 of FIG. 1. Fuel system 200 may be operated by a controller to perform some or all of the operations described with reference to the process flows of FIG. 3.

Fuel system 200 includes a fuel storage tank 210 for storing the fuel on-board the vehicle, a lower pressure fuel pump (LPP) 212 (herein also referred to as fuel lift pump 212), and a higher pressure fuel pump (HPP) 214 (herein also referred to as fuel injection pump 214). Fuel may be provided to fuel tank 210 via fuel filling passage 204. In one example, LPP 212 may be an electrically-powered lower pressure fuel pump disposed at least partially within fuel tank 210. LPP 212 may be operated by a controller 222 (e.g., controller 12 of FIG. 1) to provide fuel to HPP 214 via fuel passage 218. LPP 212 can be configured as what may be referred to as a fuel lift pump. As one example, LPP 212 may be a turbine (e.g., centrifugal) pump including an electric (e.g., DC) pump motor, whereby the pressure increase across the pump and/or the volumetric flow rate through the pump may be controlled by varying the electrical power provided to the pump motor, thereby increasing or decreasing the motor speed. For example, as the controller reduces the electrical power that is provided to lift pump 212, the volumetric flow rate and/or pressure increase across the lift pump may be reduced. The volumetric flow rate and/or pressure increase across the pump may be increased by increasing the electrical power that is provided to lift pump 212. As one example, the electrical power supplied to the lower pressure pump motor can be obtained from an alternator or other energy storage device on-board the vehicle (not shown), whereby the control system can control the electrical load that is used to power the lower pressure pump. Thus, by varying the voltage and/or current provided to the lower pressure fuel pump, the flow rate and pressure of the fuel provided at the inlet of the higher pressure fuel pump 214 is adjusted.

LPP 212 may be fluidly coupled to a filter 217, which may remove small impurities contained in the fuel that could potentially damage fuel handling components. A check valve 213, which may facilitate fuel delivery and maintain fuel line pressure, may be positioned fluidly upstream of filter 217. With check valve 213 upstream of the filter 217, the compliance of low-pressure passage 218 may be increased since the filter may be physically large in volume. Furthermore, a pressure relief valve 219 may be employed to limit the fuel pressure in low-pressure passage 218 (e.g., the output from lift pump 212). Relief valve 219 may include a ball and spring mechanism that seats and seals at a specified pressure differential, for example. The pressure differential set-point at which relief valve 219 may be configured to open may assume various suitable values; as a non-limiting example the set-point may be 6.4 bar or 5 bar (g). An orifice check valve 221 may be placed in series with an orifice 223 to allow for air and/or fuel vapor to bleed out of the lift pump 212. In some embodiments, fuel system 8 may include one or more (e.g., a series) of check valves fluidly coupled to low-pressure fuel pump 212 to impede fuel from leaking back upstream of the valves. In this context, upstream flow refers to fuel flow traveling from fuel rails 250, 260 towards LPP 212 while downstream flow refers to the nominal fuel flow direction from the LPP towards the HPP 214 and thereon to the fuel rails.

Fuel lifted by LPP 212 may be supplied at a lower pressure into a fuel passage 218 leading to an inlet 203 of HPP 214. HPP 214 may then deliver fuel into a first fuel rail 250 coupled to one or more fuel injectors of a first group of direct injectors 252 (herein also referred to as a first injector group). Fuel lifted by the LPP 212 may also be supplied to a second fuel rail 260 coupled to one or more fuel injectors of a second group of direct injectors 262 (herein also referred to as a second injector group). As elaborated below, HPP 214 may be operated to raise the pressure of fuel delivered to each of the first and second fuel rail above the lift pump pressure, with the first fuel rail coupled to the first direct injector group operating with a variable high pressure while the second fuel rail coupled to the second direct injector group operates with a fixed high pressure. As a result, fixed and variable high pressure direct injection may be enabled. The high pressure fuel pump is coupled downstream of the low pressure lift pump with no additional pump positioned in between the high pressure fuel pump and the low pressure lift pump.

While each of first fuel rail 250 and second fuel rail 260 are shown dispensing fuel to four fuel injectors of the respective injector group 252, 262, it will be appreciated that each fuel rail 250, 260 may dispense fuel to any suitable number of fuel injectors. As one example, first fuel rail 250 may dispense fuel to one fuel injector of first injector group 252 for each cylinder of the engine while second fuel rail 260 may dispense fuel to one fuel injector of second injector group 262 for each cylinder of the engine. As depicted, each cylinder of engine 202 may receive fuel at variable high pressure from the first fuel rail via at least one direct injector of the first injector group 252, and also receive fuel at fixed high pressure from the second fuel rail via at least one direct injector of the second injector group 262.

Controller 222 can individually actuate each of the direct injectors 252 via a first injection driver 237 and actuate each of the direct injectors 262 via a second direct injection driver 238. The controller 222, the drivers 237, 238 and other suitable engine system controllers can comprise a control system. While the drivers 237, 238 are shown external to the controller 222, it should be appreciated that in other examples, the controller 222 can include the drivers 237, 238 or can be configured to provide the functionality of the drivers 237, 238. Controller 222 may include additional components not shown, such as those included in controller 12 of FIG. 1.

HPP 214 may be an engine-driven, positive-displacement pump. As one non-limiting example, HPP 214 may be a BOSCH HDP5 HIGH PRESSURE PUMP, which utilizes a solenoid activated pressure control valve (e.g., fuel volume regulator, magnetic solenoid valve, etc.) 236 to vary the effective pump volume of each pump stroke. That is, the output of HPP is mechanically controlled and not electronically controlled by an external controller. HPP 214 may be mechanically driven by the engine in contrast to the motor driven LPP 212. HPP 214 includes a pump piston 228, a pump compression chamber 205 (herein also referred to as compression chamber), and a step-room 227. Pump piston 228 receives a mechanical input from the engine crank shaft or cam shaft via cam 230, thereby operating the HPP according to the principle of a cam-driven single-cylinder pump. A sensor (not shown in FIG. 2) may be positioned near cam 230 to enable determination of the angular position of the cam (e.g., between 0 and 360 degrees), which may be relayed to controller 222.

Fuel system 200 may optionally further include accumulator 215. When included, accumulator 215 may be positioned downstream of lower pressure fuel pump 212 and upstream of higher pressure fuel pump 214, and may be configured to hold a volume of fuel that reduces the rate of fuel pressure increase or decrease between fuel pumps 212 and 214. For example, accumulator 215 may be coupled in fuel passage 218, as shown, or in a bypass passage 209 coupling fuel passage 218 to the step-room 227 of HPP 214. The volume of accumulator 215 may be sized such that the engine can operate at idle conditions for a predetermined period of time between operating intervals of lower pressure fuel pump 212. For example, accumulator 215 can be sized such that when the engine idles, it takes one or more minutes to deplete pressure in the accumulator to a level at which higher pressure fuel pump 214 is incapable of maintaining a sufficiently high fuel pressure for fuel injectors 252, 262. Accumulator 215 may thus enable an intermittent operation mode (or pulsed mode) of lower pressure fuel pump 212. By reducing the frequency of LPP operation, power consumption is reduced. In other embodiments, accumulator 215 may inherently exist in the compliance of fuel filter 217 and fuel passage 218, and thus may not exist as a distinct element.

A lift pump fuel pressure sensor 231 may be positioned along fuel passage 218 between lift pump 212 and higher pressure fuel pump 214. In this configuration, readings from sensor 231 may be interpreted as indications of the fuel pressure of lift pump 212 (e.g., the outlet fuel pressure of the lift pump) and/or of the inlet pressure of higher pressure fuel pump. Readings from sensor 231 may be used to assess the operation of various components in fuel system 200, to determine whether sufficient fuel pressure is provided to higher pressure fuel pump 214 so that the higher pressure fuel pump ingests liquid fuel and not fuel vapor, and/or to minimize the average electrical power supplied to lift pump 212. While lift pump fuel pressure sensor 231 is shown as being positioned downstream of accumulator 215, in other embodiments the sensor may be positioned upstream of the accumulator.

First fuel rail 250 includes a first fuel rail pressure sensor 248 for providing an indication of a first direct injection fuel rail pressure to the controller 222. Likewise, second fuel rail 260 includes a second fuel rail pressure sensor 258 for providing an indication of a second direct injection fuel rail pressure to the controller 222. An engine speed sensor 233 can be used to provide an indication of engine speed to the controller 222. The indication of engine speed can be used to identify the speed of higher pressure fuel pump 214, since the pump 214 is mechanically driven by the engine 202, for example, via the crankshaft or camshaft.

First fuel rail 250 is coupled to an outlet 208 of HPP 214 along fuel passage 278. In comparison, second fuel rail 260 is coupled to an inlet 203 of HPP 214 via fuel passage 288. A check valve 274 and a pressure relief valve 272 may be positioned between the outlet 208 of the HPP 214 and the first fuel rail. In the depicted example, check valve 274 may be provided in fuel passage 278 to reduce or prevent back-flow of fuel from first fuel rail 250 into high pressure pump 214. In addition, pressure relief valve 272, arranged parallel to check valve 274 in bypass passage 279, may limit the pressure in fuel passage 278, downstream of HPP 214 and upstream of first fuel rail 250. For example, pressure relief valve 272 may limit the pressure in fuel passage 278 to 200 bar. As such, pressure relief valve 272 may limit the pressure that would otherwise be generated in fuel passage 278 if pressure control valve 236 were (intentionally or unintentionally) open and while high pressure fuel pump 214 were pumping.

One or more check valves and pressure relief valves may also be coupled to fuel passage 218, downstream of LPP 212 and upstream of HPP 214. For example, inlet check valve 234 may be provided in fuel passage 218 to reduce or prevent back-flow of fuel from high pressure pump 214 to low pressure pump 212 and fuel tank 210. In addition, pressure relief valve 232 may be provided in a bypass passage, positioned parallel to check valve 234. Pressure relief valve 232 may limit the pressure in fuel passage 218, upstream of HPP 214. For example, pressure relief valve 232 may limit the pressure in fuel passage 218 to 15 bar. As such, pressure relief valve 232 may limit the pressure that would otherwise be generated in fuel passage 218 if pressure control valve 236 were (intentionally or unintentionally) open and while high pressure fuel pump 214 were pumping.

Controller 222 may be configured to regulate fuel flow into HPP 214 through pressure control valve 236 by energizing or de-energizing the solenoid valve (based on the solenoid valve configuration) in synchronism with the driving cam. Accordingly, the solenoid activated pressure control valve 236 may be operated in a first mode where the valve 236 is positioned within HPP inlet 203 to limit (e g inhibit) the amount of fuel traveling through the solenoid activated pressure control valve 236. The solenoid valve may also be operated in a second mode where the solenoid activated pressure control valve 236 is effectively disabled and fuel can travel upstream and downstream of the valve, and into HPP 214.

As such, solenoid activated pressure control valve 236 may be configured to regulate the mass (or volume) of fuel compressed into the direct injection fuel pump. In one example, controller 222 may adjust a closing timing of the solenoid pressure control check valve to regulate the mass of fuel compressed. For example, a late pressure control valve closing may reduce the amount of fuel mass ingested into compression chamber 205. The solenoid activated check valve opening and closing timings may be coordinated with respect to stroke timings of the direct injection fuel pump.

Pressure relief valve 232 allows fuel flow out of solenoid activated pressure control valve 236 toward the LPP 212 when pressure between pressure relief valve 232 and solenoid operated pressure control valve 236 is greater than a predetermined pressure (e.g., 10 bar). When solenoid operated pressure control valve 236 is deactivated (e.g., not electrically energized), solenoid operated pressure control valve operates in a pass-through mode and pressure relief valve 232 regulates pressure in compression chamber 205 to the single pressure relief set-point of pressure relief valve 232 (e.g., 15 bar). Regulating the pressure in compression chamber 205 allows a pressure differential to form from the piston top to the piston bottom. The pressure in step-room 227 is at the pressure of the outlet of the low pressure pump (e.g., 5 bar) while the pressure at piston top is at pressure relief valve regulation pressure (e.g., 15 bar). The pressure differential allows fuel to seep from the piston top to the piston bottom through the clearance between the piston and the pump cylinder wall, thereby lubricating HPP 214. Piston 228 reciprocates up and down. HPP 214 is in a compression stroke when piston 228 is traveling in a direction that reduces the volume of compression chamber 205. HPP 214 is in a suction stroke when piston 228 is traveling in a direction that increases the volume of compression chamber 205.

A forward flow outlet check valve 274 may be coupled downstream of an outlet 208 of the compression chamber 205. Outlet check valve 274 opens to allow fuel to flow from the high pressure pump outlet 208 into a fuel rail only when a pressure at the outlet of direct injection fuel pump 214 (e.g., a compression chamber outlet pressure) is higher than the fuel rail pressure. Thus, during conditions when direct injection fuel pump operation is not requested, controller 222 may deactivate solenoid activated pressure control valve 236 and pressure relief valve 232 regulates pressure in compression chamber 205 to a single substantially constant pressure (e.g., regulation pressure) during most of the compression stroke. On the intake stroke the pressure in compression chamber 205 drops to a pressure near the pressure of the lift pump (212). Lubrication of DI pump 214 may occur when the pressure in compression chamber 205 exceeds the pressure in step-room 227. This difference in pressures may also contribute to pump lubrication when controller 222 deactivates solenoid activated pressure control valve 236. One result of this regulation method is that the fuel rail is regulated to a minimum pressure, approximately the pressure relief of pressure relief valve 232. Thus, if pressure relief valve 232 has a pressure relief setting of 10 bar, the fuel rail pressure becomes 15 bar because this 10 bar adds to the 5 bar of lift pump pressure. Specifically, the fuel pressure in compression chamber 205 is regulated during the compression stroke of direct injection fuel pump 214. Thus, during at least the compression stroke of direct injection fuel pump 214, lubrication is provided to the pump. When direct fuel injection pump enters a suction stroke, fuel pressure in the compression chamber may be reduced while still some level of lubrication may be provided as long as the pressure differential remains. Another pressure relief valve 272 may be placed in parallel with check valve 274. Pressure relief valve 272 allows fuel flow out of the DI fuel rail 250 toward pump outlet 208 when the fuel rail pressure is greater than a predetermined pressure.

As such, while the direct injection fuel pump is operating, flow of fuel there-though ensures sufficient pump lubrication and cooling. However, during conditions when direct injection fuel pump operation is not requested, such as when no direct injection of fuel is requested, the direct injection fuel pump may not be sufficiently lubricated if fuel flow through the pump is discontinued. During such conditions, the lift pump may be transiently operated in a pulsed mode where the lift pump operation is adjusted based on a pressure estimated at the outlet of the lift pump and inlet of the high pressure pump. In particular, responsive to high pressure pump inlet pressure falling below a fuel vapor pressure, the lift pump may be operated until the inlet pressure is at or above the fuel vapor pressure. This reduces the risk of the high pressure fuel pump ingesting fuel vapors (instead of fuel) and ensuing engine stall events.

It is noted here that the high pressure pump 214 of FIG. 2 is presented as an illustrative example of one possible configuration for a high pressure pump. Components shown in FIG. 2 may be removed and/or changed while additional components not presently shown may be added to pump 214 while still maintaining the ability to deliver high-pressure fuel to a fixed pressure and a variable pressure direct injection fuel rail.

Solenoid activated pressure control valve 236 may also be operated to direct fuel back-flow from the high pressure pump to one of pressure relief valve 232 and accumulator 215. For example, pressure control valve 236 may be operated to generate and store fuel pressure in accumulator 215 for later use. As an example, the accumulator may store fuel volume during an intake stroke (that is, down stroke) of piston 228 when the fuel is pushed out of step room 227 into accumulator 215. During a compression stroke (that is up stroke) of piston 228, the accumulator may release fuel volume into step room 217. Further, when pressure control valve 236 is not energized, during the compression stroke of piston 228, the accumulator stores fuel volume when the fuel is pushed out of compression chamber 205 and into the accumulator. During the intake stroke of piston 228, the accumulator releases fuel volume into the compression chamber. Still further, accumulator 215 fills when lift pump 212 is powered with a voltage that results in a pressure that exceeds line pressure in 218. The accumulator drains when lift pump 212 is de-powered and high pressure pump 214 is gulping in fuel (net effect).

While the first direct injection fuel rail 250 is coupled to the outlet 208 of HPP 214 (and not to the inlet of HPP 214), second direct injection fuel rail 260 is coupled to the inlet 203 of HPP 214 (and not to the outlet of HPP 214). In particular, second fuel rail 260 is coupled to HPP inlet 203 at a location upstream of solenoid activated pressure control valve 236 and downstream of check valve 234 and pressure relief valve 232. Further, no additional pump may be required between lift pump 212 and the direct injection fuel rail 260. As elaborated below, the specific configuration of the fuel system with the direct injection fuel rail coupled to the inlet of the high pressure pump via a pressure relief valve and a check valve enables the pressure at the second fuel rail to be raised via the high pressure pump to a fixed default pressure that is above the default pressure of the lift pump. That is, the fixed high pressure at the direct injection fuel rail is derived from the high pressure piston pump, and more specifically from the back-flow of the high pressure pump.

When the high pressure pump 214 is not reciprocating, such as at key-up before cranking, check valve 244 allows the second fuel rail to fill at 5 bar. The pressure in the second fuel rail may not increase above lift pump pressure when pump 214 is not reciprocating. As such, without check valve 244 the direct injection fuel rail volume would prevent function of the second fuel rail.

When high pressure pump 214 is reciprocating, compression pressure relief valve 242 then sets the pressure in the second fuel rail to 15 bar. In addition, the minimum pressure in the first fuel rail is also set to 15 bar. Thus, the fixed high pressure in the second fuel rail is created by the back-flow from the high pressure fuel pump.

In this way, the high pressure fuel pump is operated to deliver fuel at a variable high pressure (such as between 15-200 bar) to the direct fuel injectors 252 via the first fuel rail 250 while also delivering fuel at a fixed high pressure (such as at 15 bar) to the direct fuel injectors 262 via the second fuel rail 260. The variable pressure may include a minimum pressure that is at the fixed pressure (as in the system of FIG. 2) or above the fixed pressure. In the configuration depicted at FIG. 2, the fixed pressure of the second direct injection fuel rail is the same as the minimum pressure for the first direct injection fuel rail, both being higher than the typical pressure of the lift pump. Herein, the fuel delivery from the high pressure pump is controlled via the upstream (solenoid activated) pressure control valve and further via the various check valve and pressure relief valves coupled to the inlet of the high pressure pump. By adjusting operation of the solenoid activated pressure control valve, the fuel pressure at the first fuel rail is raised from the fixed pressure to the variable pressure while maintaining the fixed pressure at the second fuel rail. In addition, the fixed pressure of the second fuel rail is based on the pressure set-point of a mechanical pressure relief valve 242 positioned downstream of the low pressure lift pump and upstream of the pressure control valve 236 of the high pressure fuel pump. In alternate embodiments, the check valve and pressure relief valves may be arranged between the high pressure pump inlet and the second fuel rail so that the minimum pressure at the first fuel rail 250 at the outlet of HPP 214 is higher than the fixed pressure in the second fuel rail 260 and at the inlet of the HPP 214. For example, in order to decrease the pressure in rail 260 by 5 bar, check valve 244 may be configured such that it requires 5 bar to open check valve 244 (that is, delta pressure across check valve 244 is 5 bar). In some examples, the minimum pressure in rail 250 may be lowered by a desired pressure (e.g. 2 bar) by increasing a pressure to open for check valve 274 by the desired pressure (e.g. 2 bar).

Controller 12 can also control the operation of each of fuel pumps 212, and 214 to adjust an amount, pressure, flow rate, etc., of a fuel delivered to the engine. As one example, controller 12 can vary a pressure setting, a pump stroke amount, a pump duty cycle command, and/or fuel flow rate of the fuel pumps to deliver fuel to different locations of the fuel system. A driver (not shown) electronically coupled to controller 222 may be used to send a control signal to the low pressure pump, as required, to adjust the output (e.g. speed) of the low pressure pump.

Figure 3:
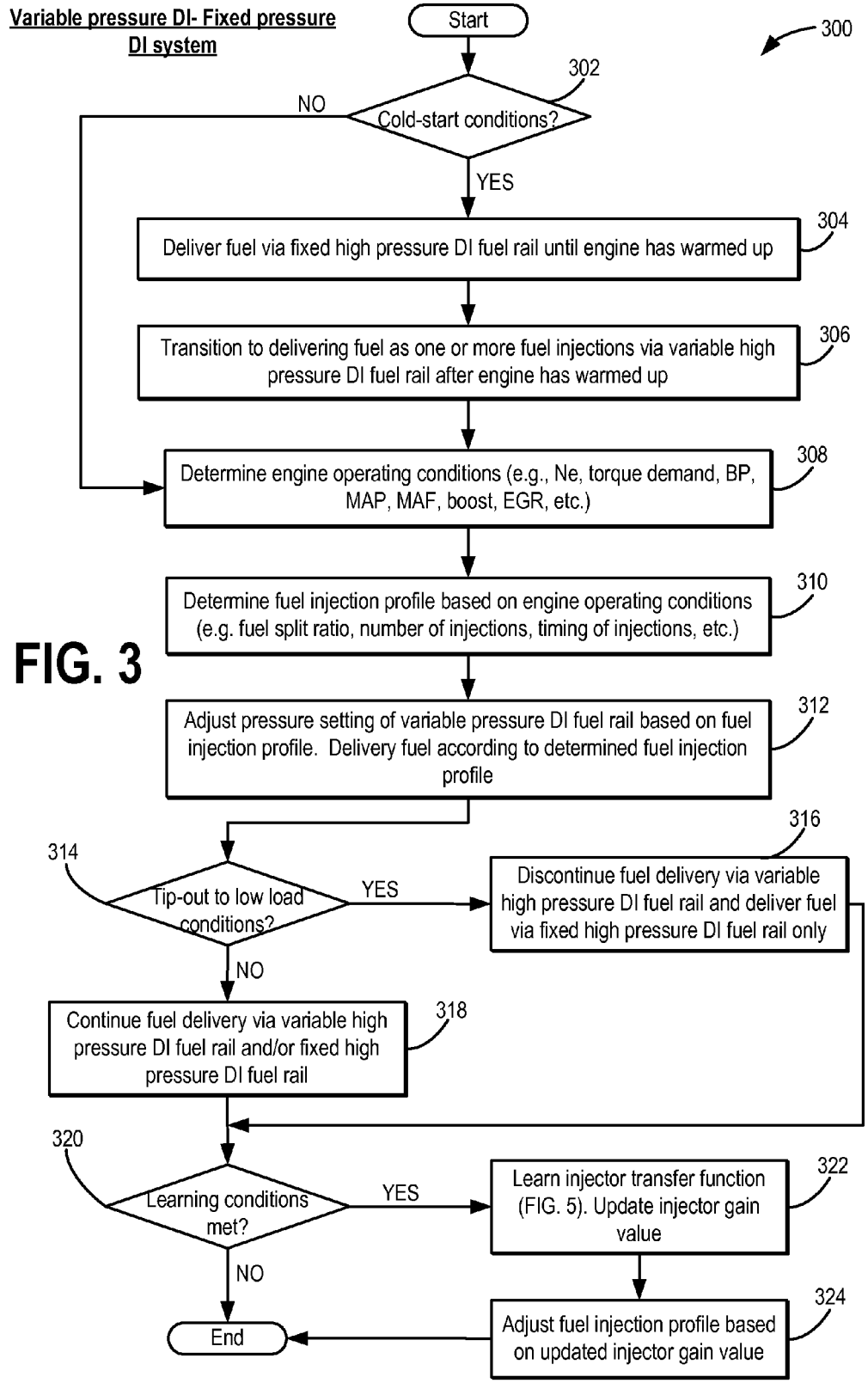
FIG. 3 depicts a flow chart of a method for operating a high pressure pump to provide a fixed high pressure at a first direct injection fuel rail and a variable high pressure at a second direct injection fuel rail.

Now turning to FIG. 3, an example routine 300 is shown for operating a high pressure fuel injection pump to deliver fuel at variable high pressure to each of a first fuel rail coupled to direct injectors and at a fixed high pressure to a second fuel rail coupled to direct injectors. The method allows one group of direct injectors to be operated with a fixed high pressure while the other group of direct injectors is operated with a variable high pressure. The method also enables fixed high pressure direct injection to be used for delivering fuel to an engine cylinder during conditions when fuel delivery via the variable (ultra-high pressure) direct injectors are limited, such as due to the need for very low direct injection pulse-widths.

At 302, it may be determined if engine cold-start conditions are present. In one example, engine cold start conditions may be confirmed if the engine temperature is below a threshold, exhaust catalyst temperature is below a light-off temperature, ambient temperature is below a threshold, and/or a threshold duration has elapsed since a prior engine-off event. If cold-start conditions are confirmed, then at 304, the routine includes, during the engine cold-start condition, for a number of combustion events since the engine start, operating the high pressure fuel pump to direct inject fuel from the second fuel rail to the engine cylinder at fixed pressure. Fuel may be delivered from the second fuel rail and one or more direct injections. For example, fuel may be delivered from the second fuel rail as multiple intake stroke injections, multiple compression stroke injections, or a combination thereof. That is, fuel may not be delivered to the engine for a number of combustion events since engine cold-start (e.g., one combustion event) via the direct injectors coupled to the variable high pressure fuel rail. This is because during cold-start (or extreme cold-start) conditions, due to the pressure of the variable pressure direct injection fuel rail being limited, the direct injectors may not be capable of delivering enough fuel to the engine in each injection. At the same time, the pressure output of the high pressure fuel map may not be run higher during the cold-start due to injector seal limits. During such cold-start conditions, by shifting to delivering fuel via fixed pressure direct injection, more fuel may be delivered in each injection by using the direct injector and sufficient fuel atomization may be enabled via the fixed high pressure of the second direct injection fuel rail. Consequently, cold-start performance of the engine is improved. After the number of combustion events since the engine cold-start has elapsed, fuel may be direct injected into the engine cylinder from the first fuel rail at the variable pressure as one or more intake and/or compression stroke injections. During cold start, some fueling may be performed during the compression stroke based on the fuel type. For example, as an amount of ethanol in the fuel increases, more fueling may be performed during the compression stroke for cold start. An example cold start fuel injection profile is described below with reference to FIG. 4. During cranking, only fixed pressure DI injection may be performed for a set number of cylinder injection events. This will allow the high pressure system to build pressure for high pressure injection without compromising the start time. After the set number of injection events, variable pressure DI injection may be performed.

FIG. 4 shows a map 400 of valve timing and piston position, with respect to an engine position, for a given engine cylinder. During an engine start, while the engine is being cranked, an engine controller may be configured to adjust a fuel injection profile of fuel delivered to the cylinder. In particular, fuel may be delivered as a first profile during an engine cold-start when fuel delivery via direct fuel injectors is pulse-width limited. In comparison, fuel may be delivered as a second profile during an engine hot-start when fuel delivery via direct fuel injectors is not pulse-width limited. The fuel injection may be transitioned from the first profile to the second profile following engine cranking The first fuel injection profile may leverage fixed high pressure direct injection, generated via the high pressure pump, to provide sufficient fuel atomization, while the second fuel injection profile may leverage variable high pressure direct injection, also generated via the high pressure pump, to provide sufficient fuel atomization. For example, during hot starts, fixed pressure injection may be performed first followed by high variable pressure injection in the intake stroke. As such, since the engine and cylinder walls are hot (e.g., during hot restarts on E85 fuel applications in a stop-start system), compression stroke injection for high ethanol content fuels may not be required.

Map 400 illustrates an engine position along the x-axis in crank angle degrees (CAD). Curve 408 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 408, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

Curves 402 and 404 depict valve timings for an exhaust valve (dashed curve 402) and an intake valve (solid curve 404) during a normal engine operation. As illustrated, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

As a result of the timing differences between exhaust valve closing and intake valve opening, for a short duration, before the end of the exhaust stroke and after the commencement of the intake stroke, both intake and exhaust valves may be open. This period, during which both valves may be open, is referred to as a positive intake to exhaust valve overlap 406 (or simply, positive valve overlap), represented by a hatched region at the intersection of curves 402 and 404. In one example, the positive intake to exhaust valve overlap 406 may be a default cam position of the engine present during an engine cold start.

Plot 410 depicts an example fuel injection profile that may be used during an engine cold start, in an engine system configured for variable and fixed high pressure direct fuel injection via a common high pressure pump. Profile 410 may be used to improve fuel atomization and reduce an amount of engine start exhaust PM emissions without degrading engine combustion stability. As elaborated herein, injection profile 410 may be performed for a number of combustion events (e.g., one) since an engine cold-start with direct injection of fuel at only the fixed pressure and without any direct injection of fuel at higher variable pressures. However, in alternate examples, the cold-start fuel injection profile may include a larger portion of fuel being direct injected at the fixed pressure and a smaller portion of fuel being direct injected at the higher variable pressure. For example, the high pressure pump may provide the total amount of fuel to the cylinder including a majority of the fuel as one or more high pressure direct injections D1 delivered at the fixed pressure (e.g., 15 bar) via the fixed pressure fuel rail during intake stroke, and a remaining small amount of the fuel as direct injection D3 delivered at variable high pressure (e.g., between 15 and 200 bar).

Fuel injection profile 410 may be used for a first number of combustion events since an engine cold start. In one example, fuel injection profile 410 may be used for only the first combustion event since an engine cold-start, or an engine extreme cold-start. An engine controller is configured to operate the high pressure pump to provide the total amount of fuel to the cylinder as one or more high pressure direct injections D1 delivered at the fixed pressure (e.g., 15 bar) via the fixed pressure fuel rail. In the depicted example, fuel is delivered as two asymmetric intake stroke direct injections at the fixed pressure (15 bar). In alternate examples, fuel may be delivered as a single fixed pressure direct injection, an intake and a compression stroke direct injection, symmetric multiple direct injections, etc. The direct injection D1 may be performed at a first average timing CAD1 (herein, during the intake stroke). The number of fixed pressure direct injections may be selected based on engine temperature and the type of fuel. Under extreme cold conditions, multiple (e.g., 2 injections) may be performed. Under very cold temperature conditions, a large amount of fueling may be needed for cold start. With single injection, the large amount of fuel may hit the walls of the cylinder. Therefore, multiple injections may be preferred to reduce the momentum of the injection so as to minimize fuel hitting the cylinder walls and the piston surface. In fuel injection profile 410, no fuel is delivered as a direct injection at the higher pressure (e.g., between 15-200 bars). This is due to the variable high pressure direct injection fuel rail being pressure limited during the cold-start conditions. At the same time, the direct injection fuel rail variable pressure cannot be raised any further by increasing operation of the high pressure fuel pump due to injector seal limits as maximum injection pressure is limited during cold operation due to marginal performance of injector seal in the extreme cold.

During such conditions, fuel atomization is advantageously provided by using the fixed pressure direct injection. In addition, the fixed pressure direct injection allows the requested fuel mass to be delivered without incurring particulate matter emission issues, as may be expected at the higher pressure direct injection.

In addition to delivering the fuel as a single high pressure port fuel injection, a spark ignition timing may be adjusted. For example, spark timing may be advanced towards MBT during, as shown at S1, when the engine is started at extreme cold temperatures. In one example, spark timing S1 (solid bar) may be set to 12 degrees before TDC.

Plot 420 depicts an example fuel injection profile that may be used during an engine hot start, in an engine system configured for fixed and variable high pressure direct fuel injection via a common high pressure pump. Profile 420 may be used to improve fuel atomization. Injection profile 420 may be performed for a number of combustion events since an engine hot-start with only direct injection of fuel at the variable pressure and no direct injection of fuel at the fixed pressure. However, in alternate examples, the hot-start fuel injection profile may include a larger portion of fuel being direct injected at the variable pressure and a smaller portion of fuel being direct injected at the fixed pressure.

Fuel injection profile 420 may be used during a second number of combustion events since an engine hot start, the second number larger than the first number of combustion events for which fuel injection profile 410 is applied on a cold-start. In one example, fuel injection profile 420 may be used for only the first combustion event since an engine hot-start. An engine controller is configured to operate the high pressure pump to provide the total amount of fuel to the cylinder as one or more high pressure direct injections D2 delivered at the variable pressure (e.g., between 15 and 200 bar) via the variable pressure fuel rail. The number of variable pressure direct injections may be selected based on the engine coolant temperature and the amount of ethanol content in the fuel.

In the depicted example, fuel is delivered as multiple high pressure direct injections D2, depicted as diagonally striped blocks. While the depicted example shows fuel being direct injected as three high pressure direct injections, in alternate examples, fuel may be delivered as a smaller or larger number of direct injections. The direct injection D2 may be performed as a first and second intake stroke injection and a third compression stroke injection, the injections adjusted to have an average injection timing of CAD2 that is later than average injection timing CAD1. In the depicted example, the multiple high pressure direct injections are asymmetric with a larger amount of the total fuel mass delivered in the intake stroke injections and a remaining smaller amount of the total fuel mass delivered in the compression stroke injection. However this is not meant to be limiting. In alternate examples, a larger amount of the total fuel mass may be delivered in the compression stroke. Further still, the injections may be symmetric with the total amount of fuel delivered as multiple injections of a fixed amount.

In fuel injection profile 520, no fuel is delivered as a fixed pressure direct injection. This is due to the direct injection fuel rail pressure being sufficiently high during the hot-start condition. During such conditions, fuel atomization can be provided by using the higher variable pressure direct injection.

In addition to delivering the fuel as multiple high pressure direct fuel injections, a spark ignition timing may be adjusted. For example, spark timing may be retarded from MBT during the direct injection, as shown at S2, when the engine is hot restarted. In one example, spark timing S2 (solid bar) may be set to TDC. In another example, spark timing S2 may be set to after TDC.

Returning to FIG. 3, the controller may continue to deliver fuel (at 304) to the engine for a number of combustion events during the cold-start until the engine has warmed up sufficiently. For example, fuel may be only direct injected at the fixed pressure (e.g., at 15 bar) until the exhaust catalyst temperature is higher than the light-off temperature. Alternatively, fuel may be only direct injected at the fixed pressure until a threshold number of combustion events since the cold-start have elapsed. After the threshold number of combustion events has elapsed, at 306, the routine includes transitioning to operating the high pressure fuel pump to direct inject fuel at a variable pressure to the engine during the cold-start over one or more intake and/or compression stroke injections. For example, fuel may be delivered as multiple intake stroke and/or multiple compression stroke injections at a pressure of 15-200 bar.

If engine cold-start conditions are not confirmed, the routine moves to 308 where engine operating conditions including engine speed, torque demand, MAP, MAF, etc., are estimated and/or measured. Then, at 310, based on the estimated operating conditions, a fuel injection profile may be determined. This may include, for example, an amount of fuel (herein also referred to as the fuel mass) to be delivered to the engine based on the determined engine operating conditions, as well as a fuel injection timing, and a fuel split ratio. The fuel split ratio may include the proportion of the total fuel mass to be delivered to an engine cylinder via direct injection at the fixed pressure relative to direct injection at the variable pressure. The fuel split ratio may also include whether the total amount of fuel is to be delivered as a single or multiple injections per fuel injection cycle. The fuel injection profile may further include a fuel injection pressure and a fuel injection pulse width for each injection from the port and the direct injectors.

At 312, the routine includes adjusting the pressure setting of the variable high pressure fuel rail coupled to the direct injectors based on the determined fuel injection profile. For example, the pressure of the direct injection fuel rail may be increased as the pressure setting of a requested direct injection event increases.

At 314, it may be determined if a tip-out event has occurred and further if the tip-out is to a low load condition. In one example, a tip-out to low load may be confirmed if a vehicle driver tips out to below a threshold load. At 316, the routine includes, in response to the tip-out to below a threshold load, transitioning from direct injecting at least some fuel at the variable pressure to only direct injecting fuel at the fixed pressure. Herein, at the low load, the fuel pulse width required may be too small to deliver fuel accurately via the higher variable pressure direct injectors. Thus, to reduce fueling errors and torque transients, fuel delivery via the lower fixed pressure direct injectors may be enabled. From 316, the routine may move to 320.

If a tip-out to low load condition is not confirmed, at 318, a tip-out to mid load or no tip-out event may be confirmed. In one example, a tip-out to mid load may be confirmed due to the vehicle driver tipping out to above the threshold load. At 318, the routine includes, in response to the tip-out to above a threshold load, or no tip-out to below the threshold, or in response to no tip-out event having occurred, continuing to direct inject at least some fuel at the variable pressure according to the fuel injection profile determined at 310. For example, fuel may be delivered as one or more direct injections at the variable pressure, one or more direct injections at the fixed pressure, or a combination thereof.

At 320, it may be determined if injector characteristic learning conditions are present. As elaborated at FIG. 5, during selected conditions, such as when a threshold duration has elapsed since a last characterization of the direct injectors, and/or while engine speed and load conditions are substantially constant, injector characteristic learning conditions may be confirmed, and a learning routine may be initiated. At 322, in response to the learning conditions being met, a transfer function for each direct injector coupled to the variable high pressure fuel rail may be learned by performing an example learning routine, described herein at FIG. 5. Therein, fuel may be direct injected with a first pulse-width to an engine cylinder via a first direct injector coupled to the first fuel rail while direct injecting a remaining fuel with a second pulse-width to the engine cylinder via a second direct injector coupled to the second fuel rail, the first pulse-width operating the first direct injector in a ballistic region, the second pulse-width operating the second direct injector in a linear region. The controller may then learn a transfer function (or gain value) of the first injector based on an exhaust lambda value during the operating. At 324, the routine further includes adjusting the fuel injection profile based on the updated injector transfer function or gain value. For example, the controller may adjust operation of the first injector based on the learned transfer function.

Turning now to FIG. 5, a method for adjusting a fuel injector transfer function and operating an engine based on the adjusted transfer function is shown. For example, method 500 may enable determination of injector performance in the ballistic region (that is, at very small fuel pulse width). When operating in the ballistic region, the direct fuel injector may have more variability compared to the linear (non-ballistic) region. The direct fuel injector variability may be learnt by splitting a desired amount of fuel injected to the selected cylinder via the first direct fuel injector into two fuel injections delivered via the first and second direct injector during a cycle of the selected cylinder, and determining a relative change in an engine lambda value from nominal. The relative change in the lambda value may be utilized to determine a correction factor which may be applied to a fuel injector transfer function. In this way, the fuel injector transfer function or gain representing injector variability may be learnt without having to operate the cylinder with an air-fuel ratio that may be leaner or richer than is desired. The method of FIG. 5 may be included in the system of FIGS. 1-2 as executable instructions stored in non-transitory memory. Further, the method of FIG. 5 may be performed as part of the method of FIG. 3 and may provide the operating sequence of FIG. 6.

At 502, method 500 judges if conditions are present for characterizing fuel direct injectors and adapting fuel direct injector operation. In one example, method 500 may judge that conditions are present for characterizing fuel injectors when an engine is idling with zero driver demand torque. In other examples, method 500 may judge that conditions are present for characterizing fuel injectors when the engine is operating at a constant engine speed and load, such as when a vehicle is in cruise control mode on a flat road. If method 500 judges that conditions are present for characterizing fuel injectors, the method 500 proceeds to 504.

At 504, method 500 selects one cylinder from a group of engine cylinders for direct fuel injector characterization. In other words, a direct fuel injector of a cylinder is selected to determine if the direct fuel injector transfer function accurately describes direct fuel injector operation or fuel flow.

More specifically, the controller may select a direct injector from the first group of direct injectors coupled to the first fuel rail receiving fuel at variable high pressure via the high pressure fuel pump. As elaborated herein, the controller may advantageously use direct injection of fuel into a given cylinder from a direct injector of the second direct injector group coupled to the second fuel rail receiving fuel at fixed pressure to characterize the direct injector for the given cylinder coupled to the first fuel rail. The direct fuel injector's gain or transfer function describes fuel flow through the direct fuel injector and/or an amount of fuel delivered via the direct fuel injector based on a pulse width of a voltage supplied to the direct fuel injector. In one example, method 500 begins by selecting a direct fuel injector of cylinder number one that is coupled to the first fuel rail. However, in other examples, other cylinders may be selected. Method 500 proceeds to 508 after the cylinder is selected.

At 506, method 500 supplies fuel to the first direct injection fuel rail at a constant pressure. The constant pressure may be a pressure within the range of pressures possible in the first fuel rail's variable pressure range (e.g., between 15 and 200 bar). At the same time, the second direct injection fuel rail may be supplied fuel at the fixed pressure (e.g., at 15 bar). By supplying fuel to the first fuel rail at a constant pressure while supplying fuel to the second fuel rail at the fixed pressure, it may be possible to more accurately characterize fuel injector fuel flow rate and amount of fuel injected for a direct injector coupled to the first fuel rail. Method 500 proceeds to 510 after fuel at constant pressure is supplied to the first fuel rail and fuel at fixed pressure is supplied to the second fuel rail.

At 508, method 500 operates the engine with a constant air mass. The engine may be operated with a constant air mass via adjusting a position of a throttle or other air control device as engine speed changes. If engine speed remains constant, the position of the air mass adjusting device may remain unchanged. The constant air mass may be a predetermined amount such as an air amount to idle the engine or an air amount to maintain a constant vehicle speed at present vehicle operating conditions. By operating the engine with a constant air mass, it may be possible to ascertain fuel injector fuel delivery errors more accurately since the engine's air-fuel ratio may be less likely to change from air charge errors. Method 500 proceeds to 510 after beginning to operate the engine with a constant air mass.

At 510, method 500 adjusts the total fuel mass to be delivered to the selected cylinder by only the first direct fuel injector (to be characterized) receiving fuel from the first fuel rail at the constant pressure. At this step, no fuel is injected to the cylinder via the second direct injector receiving fuel from the second fuel rail at the fixed pressure. The total fuel mass is an amount of fuel delivered to the cylinder during a cylinder cycle of the selected cylinder in order to obtain a desired engine air-fuel ratio. As such, the total fuel mass may be delivered as a single direct injection in an intake stroke of the cylinder cycle by the first direct injector. Method 500 proceeds to 512 after the desired fuel amount is selected and applied.

At 512, method 500 determines the lambda value the engine is operating at based on output from an exhaust gas oxygen sensor (e.g. UEGO sensor). The lambda value is the engine's present air-fuel ratio divided by the stoichiometric air fuel ratio (e.g., 14.3/14.64=0.977). The oxygen sensor outputs a voltage that is converted to engine air-fuel ratio via an oxygen sensor transfer function. The present value of lambda is stored to controller memory. Additionally, the pulse width of a voltage supplied to the first direct fuel injector (that is, the fuel injector to be characterized) may also be stored to memory. Method 500 proceeds to 514 after the lambda value is stored to memory.

The method then includes splitting the desired amount of fuel injected to the selected cylinder via the first direct fuel injector into two fuel injections delivered via the first and second direct injector during a cycle of the selected cylinder. The two injections from the two injectors are provided during an intake stroke of the cylinder cycle by supplying each direct fuel injector with a distinct voltage pulse width or injection pulse width.

Specifically, at 514, a first portion of the desired fuel amount is delivered to the selected cylinder via the first direct fuel injector at the constant pressure by supplying the first direct injector with a first pulse width. At 516, a remaining, second portion of the desired fuel amount is delivered to the selected cylinder via the second direct fuel injector at the fixed pressure by supplying the second direct injector with a second pulse width. The first and second pulse widths may be adjusted so that the fuel amounts delivered by each injector are asymmetric. For example, the first direct injector may be supplied with a pulse-width that is in the ballistic region where fuel flow through the direct injector is non-linear while the second direct injector may be supplied with a pulse-width that is in the linear region where fuel flow through the direct injector is linear. The amount of fuel commanded in the two pulse widths may add up to an amount of fuel that when combined with the selected cylinder's air amount is based on providing a lambda value of one in the selected cylinder. For example, if X grams of fuel are needed to operate the selected cylinder at a lambda value of one, the amount of fuel injected by the direct fuel injector may be a first amount 0.3×, while the amount of fuel injected by the second direct fuel injector may be 0.7×. In still further example, the injections may be symmetric and the amount of fuel injected based on the first pulse width supplied to the first direct fuel injector may be fifty percent of the total fuel mass and the amount of fuel injected based on the second pulse width supplied to the second direct fuel injector may also be fifty percent of the total fuel mass delivered during the cylinder cycle.

At 518, method 500 determines the lambda value the engine is operating at based on output from the exhaust gas oxygen sensor. The lambda value is the engine's present air-fuel ratio divided by the stoichiometric air fuel ratio. The oxygen sensor outputs a voltage that is converted to engine air-fuel ratio via an oxygen sensor transfer function. The present value of lambda is stored to controller memory. Additionally, the pulse width of the two direct fuel injectors may also be stored to memory. The lambda value may then be stored as a function of the pulse-width of the first direct injector (the injector being characterized). Errors between the direct fuel injector's pulse width for delivering the desired engine air-fuel ratio and the lambda value observed by the exhaust oxygen sensor may be indications of errors in the direct fuel injector's transfer function in the direct fuel injector's ballistic operating region. Injector pulse widths that are greater than a pulse width that operates the direct fuel injector in a linear mode are expected to have a smaller effect on lambda errors. Method 500 proceeds to 520 after the lambda value is stored to memory.

In some examples, steps 514-518 may be reiterated a number of times by splitting the total fuel mass between the two fuel injectors at different ratios. For example, during a first iteration on a first cylinder fueling cycle, the first direct injector may deliver 30% of the total fuel mass and the second direct injector may deliver 70% of the total fuel mass. During a second iteration, on a second, subsequent cylinder fueling cycle, the first direct injector may deliver 20% of the total fuel mass and the second direct injector may deliver 80% of the total fuel mass. Then during a third iteration, on a third, subsequent cylinder fueling cycle, the first direct injector may deliver 10% of the total fuel mass and the second direct injector may deliver 90% of the total fuel mass, and so on. In this way, fuel injections may be adjusted till the first direct injector has been operated at a minimum pulse width that operates the direct fuel injector in its non-linear or ballistic operating region where fuel flow through the direct fuel injector is non-linear. In one example, on the first iteration, the pulse-width of the second direct injector may be at the minimum pulse-width, and over subsequent iterations, the pulse-width of the second direct injector may be gradually increased while the pulse-width of the first direct injector is gradually decreased to the minimum pulse-width.

By gradually decreasing the pulse width of the first fuel injector, the first direct fuel injector may be driven to operate closer to or deeper into a non-linear operating range of the direct fuel injector. At the same time, the pulse width of the second fuel injector may be adjusted based on the pulse width of the first fuel injector so as to provide a substantially stoichiometric combustion air-fuel ratio. This allows engine fueling errors to be reduced while providing the ability to determine fuel injector fueling errors.

At 520, method 500 judges whether or not operation of all the engine's direct fuel injectors that are coupled to the first fuel rail have been characterized. If operation of all direct fuel injectors of the first injector group has not been characterized, the method 200 proceeds to 522 wherein the routine selects a new cylinder from the engine cylinders that have not had their direct fuel injectors characterized. For example, if cylinder number one has had its direct fuel injector supplying fuel from the first fuel rail characterized, cylinder number two may be subsequently selected. In some examples, the sequence of cylinders selected for characterization may be based on the firing order. For example, in an in-line 4 cylinder engine, where the firing order is 1-3-4-2, after the direct injector of cylinder 1 has been characterized, the direct injector of cylinder 3 may be characterized. Additionally, the previously selected cylinder may resume operation in a normal mode with fuel delivered as a single fuel injection having a linear pulse-width. Method 500 returns to 506 after a new cylinder is selected for fuel injector characterization.

If operation of all the engine's direct fuel injectors that are coupled to the first fuel rail have been characterized, at 524, upon characterizing all the fuel injectors, method 500 determines corrections for ballistic or non-linear regions of direct fuel injectors of all engine cylinders. The corrections are made to nominal pulse widths (e.g., existing transfer function values) of the fuel injector at the pulse widths the fuel injector operated at in steps 514-516 during the time the fuel injection was adjusted between the first and second direct injectors. In one example, the fuel pulse width correction is determined as a function of the engine lambda value at the pulse width. For example, the fuel pulse width correction may be described as:

$$\text{Total \% reduction} = f(\% \text{ change\_in\_lambda\_from\_nom}, \text{split\_ratio})$$

where Total % reduction is the correction applied to the transfer function of the direct fuel injector of the selected cylinder at a particular direct fuel injector pulse width, % change_in_lambda_from_nom is the percent change in the observed lambda value at the particular pulse width from the lambda value at the fuel pulse width applied when the direct fuel injector is supplied fuel based on the initial pulse width (e.g., lambda value at 512), and split_ratio is the ratio of proportion of fuel delivered via the first direct injector relative to the second direct injector. The correction may be determined for and applied to all direct fuel injectors of the selected cylinders based on lambda values and pulse widths stored at 518. Thus, the corrections may be applied to all direct fuel injectors of all engine cylinders. Method 500 performs similar adjustments to the direct fuel injector's transfer function at all pulse widths the direct fuel injector was operated at between steps 514-516.

It will be appreciated that while the above routine suggests delivering the total fuel mass as a single intake stroke fuel injection delivered by the first direct injector coupled to the first fuel rail and a single intake stroke fuel injection delivered by the second direct injector coupled to the second fuel rail, in still other examples, the fuel injection delivered by the first direct injector may be split into multiple fuel injections with a ratio of the injections adjusted so that only one of the injections has a pulse-width in the ballistic region while the remaining injections have a pulse-width in the linear region. In such a scenario, the fuel pulse width correction may be determined as a function of the engine lambda value at the pulse width and further based on the split ratio of the fuel injections delivered by the first direct injector, as well a total number of injections delivered by the first fuel injector.

At 526, the values stored in a table or function that represents the transfer function of the direct fuel injector are adjusted by multiplying values stored in the transfer function by the corresponding injector correction determined at 524 and storing the result back into the direct fuel injector transfer function. For example, if the direct fuel injector transfer function describes the direct fuel injector's flow at the 400 micro-second pulse width as Z, and the correction determined at 240 for the 400 micro-second pulse width is 5%, the adjusted value stored in the direct fuel injector's transfer function is 0.05·Z. Adjustments for when the direct fuel injector is provided pulse widths other than 400 microseconds are also performed for each decrement in fuel pulse width performed at 514. Likewise, adjustments for transfer functions of other cylinder's direct fuel injectors may be performed similarly. In cases where a single transfer function describes operation of all the engine's cylinders direct fuel injectors, the single transfer function is adjusted similarly. Method 500 stores the revised transfer function or functions in memory and proceeds to 528.

At 528, method 500 operates the engine via supplying fuel to engine cylinders based on the adjusted and stored direct fuel injector transfer functions. For example, pulse widths are provided to each engine cylinder's direct fuel injector that is coupled to the first fuel rail, the pulse widths are based on a desired fuel mass to be delivered to a cylinder during a cycle of the cylinder and the transfer function that outputs a fuel injector pulse width according to a desired mass of fuel to be injected to the cylinder. Method 500 proceeds to exit after engine cylinders are operated in response to one or more revised direct fuel injector transfer functions.

In this way, the method of FIG. 5 enables a method wherein a high pressure fuel injection pump is operated to direct inject fuel with a first pulse-width to an engine cylinder via a first direct injector coupled to the first fuel rail while direct injecting a remaining fuel with a second pulse-width to the engine cylinder via a second direct injector coupled to the second fuel rail, the first pulse-width operating the first direct injector in a ballistic region, the second pulse-width operating the second direct injector in a linear region. The method further enables learning of a transfer function of the first injector based on an exhaust lambda value during the operating. An engine controller may then adjust operation of the first injector based on the learned transfer function.

Referring now to FIG. 6, an example plot of a fuel injector correction amount versus fuel injector pulse width for a direct fuel injector coupled to a variable high pressure fuel rail, the direct injector operating in a non-linear or ballistic region, is shown. The fuel injectors 252 shown in FIG. 2 (and fuel injector 166, 170 of FIG. 1) may operate similar to the way shown in FIG. 6.

The X axis represents fuel injector pulse width. A fuel injector pulse width may vary in duration from zero to tens of milliseconds. The Y axis represents a fuel flow correction from a nominal fuel injector flow rate. A nominal correction has a value of 1. When the fuel injector flow is less than nominal, the correction factor is a fraction of nominal (e.g., 0.8). The correction may be applied as one divide by 0.8 (that is, 1/0.8). When the fuel injector flow is more than the nominal, the correction factor may be more than 1 (e.g., 1.1). The circles represent individual data values for different fuel injector pulse widths.

In this example, the (first) direct fuel injector coupled to the variable high pressure fuel rail begins to operate in a non-linear or ballistic range when fuel pulse widths are less than about 500 micro-seconds. This range is indicated by leader 602. At higher or longer pulse widths, the fuel injector flow is a nominal amount as indicated by the value of one when fuel injector pulse widths are greater than 500 microseconds. This range is indicated by leader 606. When the first direct fuel injector described by plot 600 is operated with a 420 micro-second pulse width, fuel injector flow is about 0.93 of nominal fuel injector flow rate as indicated by leader 604, which indicates that as the injector is operated in the low pulse width region, the amount of fueling decreases by a greater extent than what is expected. Thus, the fuel flow rate of this particular fuel injector is decreased (prior to applying the correction) when the fuel injector is supplied a 420 micro-second injection pulse. That is, at 420 microseconds the fueling is 93% compared to the nominal (100%) for this particular injector. This indicates that when a fuel flow of 1 is requested for the injector at 420 micro-seconds, the actual delivery by the injector is 0.93. Hence the correction factor is 0.93 and a 1/correction factor (that is, 1/0.93=1.075) times fuel may be applied to operate the injector at nominal flow of 1.

The correction factor is reduced further in response to fuel injector pulse widths that are less than 420 micro-seconds. At fuel injector pulse widths greater than 500 micro seconds, the correction from nominal is one (e.g., no correction). The fuel injector's nominal flow rate may be multiplied by the correction to provide the injector's fuel flow rate when a particular pulse width is applied to the fuel injector.

A plurality of correction values shown in FIG. 6 may be stored in a table or function as a transfer function for a fuel injector. The correction values may be adjusted or updated according to the method of FIG. 5. Thus, it may be possible to describe fuel injector flow in a fuel injector's ballistic operating range where the fuel injector may exhibit non-linear flow.

In this way, during a learning condition, a controller may be configured to operate a high pressure fuel pump to split injection of fuel during a cylinder cycle into one or more direct injections delivered to a cylinder at a variable pressure via a first direct injector operating in a ballistic region, and a direct injection delivered to the cylinder at a fixed pressure via a second direct injector operating in a linear region. The controller may further learn an injector transfer function of the first direct injector based on an exhaust lambda value estimated during the operating; and after the learning condition, operate the first direct injector based on the learned transfer function. Herein, the first direct injector receives fuel from a first fuel rail coupled to an outlet of the high pressure fuel pump, while the second direct injector receives fuel from a second fuel rail coupled to an inlet of the high pressure fuel pump. The first direct injector operating in the ballistic region includes the first direct injector operating with a first pulse-width wherein fuel flow through the injector is non-linear, while the second direct injector operating in the linear region includes the second direct injector operating with a second pulse-width wherein fuel flow through the injector is linear, the first pulse-width and the second pulse width based on obtaining a stoichiometric engine lambda value of one. The one or more direct injections delivered to the engine cylinder at the variable pressure via the first direct injector may occur prior to the direct injection delivered to the cylinder at the fixed pressure via the second direct injector, the first and the second fuel injections separated by a minimum crank angle degree. Further, during the learning condition, the engine may be operated at a constant speed and air mass, and the fuel may be delivered by the first and second direct injector while a rail pressure of the first fuel rail is held constant.

Now turning to FIG. 7, map 700 of FIG. 7 shows an example of adjusting fuel injection from a variable pressure direct injection fuel rail and a fixed pressure direct injection fuel rail responsive to engine speed-load conditions. The approach allows properties of a fixed high pressure direct injection to be leveraged during conditions when a variable high pressure direct injection is constrained. In one example, the fixed high pressure direct injection may be used if the variable high pressure is too high such that a desired pulse width for operating the direct injector (for variable high pressure direct injection) is less than a minimum pulse width of the injector. In another example, injection control may switch to the fixed high pressure direct injection if the high pressure pump control has failed or if the high pressure rail pressure sensor has failed. In still another example, during normal engine operation, under high load conditions, when the fueling is performed with variable high pressure, multiple injections may be performed to reduce the momentum of the fuel causing wall wetting. During these conditions, some fuel may be delivered through fixed pressure direct injector (via single or multiple injections) and then the variable pressure direct injector can deliver the remaining fuel via single or dual injections. The number of injections through each system may be based on the minimum pulse width and the available time for injecting in the intake stroke. In this way, wall wetting and also PM emissions may be reduced. In yet another example, when operating in an enrichment mode at high speed and high load conditions, if all of the required fuel amount cannot be delivered through variable pressure direct injection system, the additional desired fuel may be delivered through the fixed pressure DI system.

Map 700 depicts changes in engine speed at plot 702, a pedal position output at plot 704, high pressure direct injection from a variable pressure fuel rail into a cylinder at plot 706, and high pressure direct injection from a fixed pressure fuel rail into a cylinder at plot 708. All plots are depicted with time along the x-axis.

Between t0 and t1, the engine may be operating at medium speed-load conditions. Based on the engine operating conditions, fuel may be delivered to each cylinder as each of a first amount of fuel that is direct injected via the variable high pressure fuel rail, and a second amount of fuel that is direct injected via the fixed high pressure fuel rail. At t1, a tip-out event may occur. Specifically, the tip-out may be to above a threshold load. That is, a small tip-out may occur. In response to the tip-out to above the threshold load, fuel injection from each of the fixed high pressure fuel rail and the variable high pressure fuel rail may be decreased. In the depicted example, fuel injection from both fuel rails is proportionately decreased. At t2, a further tip-out event may occur. Specifically, the tip-out may be to below the threshold load. That is, a large tip-out may occur. In response to the tip-out to below the threshold load, at t2, the routine includes transitioning from direct injecting at least some fuel at the variable pressure to only direct injecting fuel at the fixed pressure. That is, direct fuel injection via the variable high pressure fuel rail may be temporarily disabled. This is due to the high pressure of the fuel rail causing fueling errors at the low fuel pulse widths required following the tip-out. During such conditions, by shifting to delivering fuel via the high pressure fuel rail, fuel may be delivered more accurately. At t3, a tip-in event may occur. In response to the tip-in event, direct fuel injection via the variable pressure fuel rail may be re-enabled.

In one example, a fuel system for an engine in a vehicle comprises: a first direct injector receiving fuel from a first fuel rail and delivering fuel to an engine cylinder; a second direct injector receiving fuel from a second fuel rail and delivering fuel to the engine cylinder; a high pressure mechanical fuel pump providing fuel at a variable high pressure to the first fuel rail and at a fixed high pressure to the second fuel rail, the high pressure fuel pump including no electrical connection to a controller, the first fuel rail coupled to an outlet of the high pressure fuel pump, the second fuel rail coupled to an inlet of the high pressure fuel pump; a solenoid activated pressure control valve positioned upstream of the inlet of the high pressure fuel pump for varying a pressure of fuel delivered by the pump to the first fuel rail; and a mechanical pressure relief valve coupled upstream of the high pressure fuel pump, between the pressure control valve and the second fuel rail, the pressure relief valve configured to maintain the fixed pressure at the second fuel rail. The system further comprises a controller with computer readable instructions for: delivering fuel from the first fuel rail to the engine cylinder as multiple intake and/or compression stroke injections at the variable pressure; and delivering fuel from the second fuel rail to the engine cylinder as multiple intake and/or compression stroke injections at the fixed pressure. A number of multiple intake and/or compression stroke injections delivered to the engine cylinder at the fixed pressure is based on engine coolant temperature, desired amount of total fuel needed to be delivered at a given engine speed and load condition), catalyst temperature, failure condition of the variable pressure system while a number of multiple intake and/or compression stroke injections delivered to the engine cylinder at the variable pressure is based on engine coolant temperature, speed, Load, catalyst temperature. The controller includes further instructions for: in response to a tip-out to below a threshold load, transitioning from direct injecting at least some fuel at the variable pressure to only direct injecting fuel at the fixed pressure.

In this way, the technical effect of operating a high pressure fuel pump with a first fixed high pressure direct injection fuel rail coupled to the inlet of the pump and another variable high pressure direct injection fuel rail coupled to the outlet of the pump is that a single high pressure piston pump can be used to provide each of fixed and variable high pressure direct injection fueling capabilities. By coupling the fixed pressure direct injection rail to the inlet of the high pressure pump via a solenoid activated pressure control valve, a mechanical check valve, and a pressure relief valve, the fixed pressure in the fuel rail can be raised above the default pressure of a lift pump by leveraging the back-flow from the reciprocating piston. By enabling fixed high pressure port injection without the need for an additional dedicated pump between the lift pump and the port injection fuel rail, fixed pressure direct injection can be used to deliver fuel during conditions when variable higher pressure direct injection is pulse-width or dynamic range limited. In addition, fueling via a direct injector couple to the fixed pressure fuel rail can be advantageously used to learn and compensate for the ballistic region of a direct injector coupled to the variable pressure fuel rail. Further still, component reduction benefits are achieved. Overall, fueling errors are reduced, thereby improving engine performance.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel system, comprising:
a first direct injector receiving fuel from a first fuel rail and delivering fuel to an engine cylinder;
a second direct injector receiving fuel from a second fuel rail and delivering fuel to the engine cylinder;
a high pressure mechanical fuel pump providing fuel at a variable high pressure to the first fuel rail and at a fixed high pressure to the second fuel rail, the high pressure fuel pump including no electrical connection to a controller, the first fuel rail coupled to an outlet of the high pressure fuel pump, the second fuel rail coupled to an inlet of the high pressure fuel pump;
a solenoid activated pressure control valve positioned upstream of the inlet of the high pressure fuel pump for varying a pressure of fuel delivered by the pump to the first fuel rail; and
a mechanical pressure relief valve coupled upstream of the high pressure fuel pump, between the pressure control valve and the second fuel rail, the pressure relief valve configured to maintain the fixed pressure at the second fuel rail.

2. The system of claim 1, further comprising a controller with computer readable instructions for: delivering fuel from the first fuel rail to the engine cylinder as multiple intake and/or compression stroke injections at the variable pressure; and delivering fuel from the second fuel rail to the engine cylinder as multiple intake and/or compression stroke injections at the fixed pressure.

3. The system of claim 2, wherein a number of multiple intake and/or compression stroke injections delivered to the engine cylinder at the fixed pressure is based on an engine coolant temperature, a desired amount of total fuel for an engine speed and load condition, a catalyst temperature, a failure condition of a variable pressure system including the high pressure mechanical fuel pump, and a high pressure rail pressure sensor; and wherein a number of multiple intake and/or compression stroke injections delivered to the engine cylinder at the variable pressure is based on the engine coolant temperature, the engine speed, the engine load, and the catalyst temperature.

4. The system of claim 3, wherein the controller includes further instructions for:
in response to a tip-out to below a threshold load, transitioning from direct injecting at least some fuel at the variable pressure to only direct injecting fuel at the fixed pressure.

5. A method, comprising:
operating a high pressure fuel pump to direct inject fuel at a variable pressure via a first fuel rail, and at a fixed pressure via a second fuel rail, fuel delivery from the pump controlled via an upstream pressure control valve, wherein the second rail is coupled to an inlet of the pump while the first rail is coupled to a pump outlet.

6. The method of claim 5, wherein the fixed pressure is based on a pressure set-point of a mechanical pressure relief valve positioned downstream of a low pressure lift pump and upstream of the pressure control valve of the high pressure fuel pump.

7. The method of claim 6, wherein the high pressure fuel pump is coupled downstream of the low pressure lift pump with no additional pump positioned in between the high pressure fuel pump and the low pressure lift pump.

8. The method of claim 7, wherein the fixed pressure in the second rail is higher than a default pressure of the low pressure lift pump, and the variable pressure includes a minimum pressure that is at or above the fixed pressure; and wherein the fixed pressure is created by back-flow from the high pressure fuel pump.

9. The method of claim 6, wherein the pressure control valve is solenoid activated, the method further comprising, raising a fuel pressure at the first fuel rail from the fixed pressure to the variable pressure while maintaining the fixed pressure at the second fuel rail by adjusting the solenoid activated pressure control valve.

10. The method of claim 9, further comprising, operating the solenoid activated pressure control valve to direct fuel back-flow from the high pressure pump to one or more of a pressure relief valve and an accumulator.

11. The method of claim 5, wherein the high pressure fuel pump is not connected to an external electronic controller.

12. The method of claim 5, wherein the operating includes: direct injecting fuel with a first pulse-width to an engine cylinder via a first direct injector coupled to the first fuel rail while direct injecting a remaining fuel with a second pulse-width to the engine cylinder via a second direct injector coupled to the second fuel rail, the first pulse-width operating the first direct injector in a ballistic region, the second pulse-width operating the second direct injector in a linear region.

13. The method of claim 12, further comprising, learning a transfer function of the first injector based on an exhaust lambda value during the operating, and adjusting operating of the first injector based on the learned transfer function.

14. The method of claim 5, further comprising, transiently operating the low pressure lift pump responsive to detection of fuel vapors at the inlet of the high pressure pump.

15. The method of claim 5, further comprising: during an engine cold-start condition, for a number of combustion events since engine start, operating the high pressure fuel pump to direct inject fuel from the second fuel rail as multiple intake and/or compression stroke injections at the fixed pressure, and after the number of combustion events, operating the high pressure fuel pump to direct inject fuel from the first fuel rail as multiple intake and/or compression stroke injections at the variable pressure.

16. A fuel system method, comprising:
during a learning condition,
operating a high pressure fuel pump to split injection of fuel during a cylinder cycle into one or more direct injections delivered to a cylinder at a variable pressure via a first direct injector operating in a ballistic region, and a direct injection delivered to the cylinder at a fixed pressure via a second direct injector operating in a linear region.

17. The method of claim 16, further comprising, learning an injector transfer function of the first direct injector based on an exhaust lambda value estimated during the operating; and after the learning condition, operating the first direct injector based on the learned transfer function.

18. The method of claim 17, wherein the first direct injector receives fuel from a first fuel rail coupled to an outlet of the high pressure fuel pump, and wherein the second direct injector receives fuel from a second fuel rail coupled to an inlet of the high pressure fuel pump.

19. The method of claim 18, wherein the first direct injector operating in the ballistic region includes the first direct injector operating with a first pulse-width wherein fuel flow through the injector is non-linear, wherein the second direct injector operating in the linear region includes the second direct injector operating with a second pulse-width wherein fuel flow through the injector is linear, the first pulse-width and the second pulse width based on obtaining a stoichiometric engine lambda value of one.

20. The method of claim 19, wherein the one or more direct injections delivered to the engine cylinder at the variable pressure via the first direct injector occur prior to the direct injection delivered to the cylinder at the fixed pressure via the second direct injector, the first and the second fuel injections separated by a minimum crank angle degree.

21. The method of claim 16, wherein during the learning condition, the engine is operated at a constant speed and air mass, and the fuel is delivered by the first and second direct injector while a rail pressure of the first fuel rail is held constant.

\* \* \* \* \*